United States Patent [19]

Mettler

[11] Patent Number: 5,483,996
[45] Date of Patent: Jan. 16, 1996

[54] HEDDLE FRAME CORNER JOINT

[75] Inventor: Franz Mettler, Wollerau, Switzerland

[73] Assignee: Grob & Co. Akt, Horgen, Switzerland

[21] Appl. No.: 378,368

[22] Filed: Jan. 25, 1995

[30] Foreign Application Priority Data

Feb. 8, 1994 [DE] Germany .......................... 44 03 923.9

[51] Int. Cl.$^6$ ........................................ D03C 9/06
[52] U.S. Cl. .......................... 139/91; 403/403; 403/363
[58] Field of Search ................... 403/403, 363; 139/91

[56] References Cited

U.S. PATENT DOCUMENTS

| | | | |
|---|---|---|---|
| 3,335,759 | 8/1967 | Koch | 139/91 |
| 4,355,667 | 10/1982 | Shimizu. | |
| 5,249,605 | 10/1993 | Graf | 139/91 |
| 5,297,589 | 3/1994 | Baumann | 139/91 |

FOREIGN PATENT DOCUMENTS 2518192  6/1983  France ................................. 403/403

*Primary Examiner*—Andy Falik
*Attorney, Agent, or Firm*—Watson, Cole, Grindle & Watson

[57] ABSTRACT

A heddle frame of spaced, horizontal hollow shafts and spaced hollow side supports are corner interconnected by an angled joint element having an elongated leg portion extending within the side supports at opposite ends and beyond open longitudinal slots at such opposite ends through which protrusions of the joint element extend for extension into the opposing ends of the horizontal shafts. The leg portions of the joint elements are connected along the length thereof to the side supports by rivets, screw fastener, spot welds or adhesive.

6 Claims, 2 Drawing Sheets

HEDDLE FRAME CORNER JOINT

BACKGROUND OF THE INVENTION

This invention relates generally to a heddle frame, and more particularly to a corner joint structure for the heddle frame.

U.S. Pat. No. 4,355,667 discloses a heddle frame which includes hollow horizontal aluminum bars joined to vertical side stays utilizing connecting pieces 10 and receptacles 5. For the side stays of this known type, each connecting piece is located in a side opening 9 of the tubular side stay facing the horizontal bar, and a projecting piece 13 on the connecting piece extends into a fitting groove 7 of receptacle 5 riveted to the horizontal bar. The opening 9 extends along the entire width of the tubular side stay, and the height of that opening (in the direction of the side stay) must be at least equal to the height of the mounting portion of the connecting piece. The connecting piece is secured in the opening of the tubular side stay by rivets or spot welding. So that the tubular side stay is not excessively weakened by such openings provided for the angled joints, the height of the opening and therefore the height of the mounting section of each connecting piece is thereby limited. The region in which the rivets or spot welding can be fastened is accordingly limited and the reinforcement of the mounting section of the connecting piece on the side stay is limited to a small area.

SUMMARY OF THE INVENTION

It is therefore an object of the present invention to provide corner joints for a heddle frame wherein the side stays or hollow side supports have improved sturdiness.

According to the invention, an angled joint element connects each opposing end of each hollow side support of the frame to the horizontal hollow shafts of the frame. An inner face of each of the side supports has open slots at its opposing ends, and each joint element has an elongated leg extending into each of the hollow side supports beyond an inner edge of each of the slots for thereby strengthening the hollow side supports. And, each joint element has a protrusion extending through each of the slots and into the opposing ends of the horizontal hollow shafts. Means such as spot welding, rivets, or adhesive is provided for securely connecting the legs of the joint elements to the side supports along the length of such legs.

For the side supports according to the invention, each angled joint element is inserted from the end of the tubular side support lengthwise into the longitudinal slot and extends beyond the inner edge of the slot. Since the elongated leg of the joint element, which is located on the inside of the tubular side support and extends along the entire length of a section of the wall thereof, thereby strengthening it, occupies the entire cross section of the tubular side support, the leg of the joint element is also tightly enclosed by the tubular side support in the area adjacent the longitudinal slot. Such a construction also offers the advantage that the height of the mounting section (elongated leg) of the joint element is not restricted by the length of the longitudinal slot. The leg portion of the joint element which extends beyond the length of the slot increases the side-strengthening effect over a large portion of the length of the tubular side support, and the area in which the joint elements are attached is significantly greater. Thus, the tubular side support which is otherwise weakened by the provision of longitudinal end slots is strengthened by the present construction which likewise provides considerable reinforcement.

All the parts of the heddle frame may be of steel which may be welded together to form a sturdy heddle frame construction. The longitudinal slots of the side supports may be applied with the use of a press.

The parts of the heddle frame may be of carbon steel for reasons of economy. They can be also of rust-free steel alloy for water jet power looms. And, the finished side supports can be provided with a wear-resistant coating. A nitration method can be used, although more costly methods such as chroming are possible in special circumstances.

Other objects, advantages and novel features of the invention will become more apparent from the following detailed description of the invention when taken in conjunction with the accompanying drawings.

DETAILED DESCRIPTION OF THE INVENTION

Figure 1:
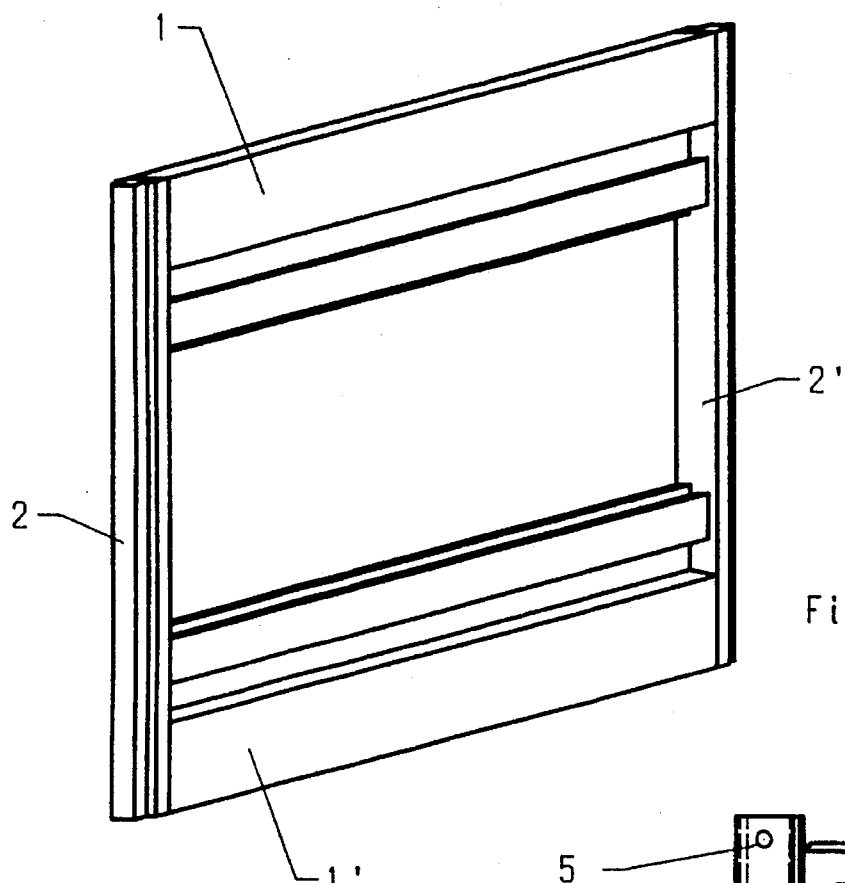
FIG. 1 is a simplified perspective view of a heddle shaft consisting of horizontal hollow shafts and hollow side supports incorporating the invention.

The heddle frame of FIG. 1, which incorporates the invention, comprises a pair of spaced, horizontal hollow shafts 1, 1' and a pair of spaced hollow side supports 2, 2' corner connected to the hollow shafts.

Figure 2:
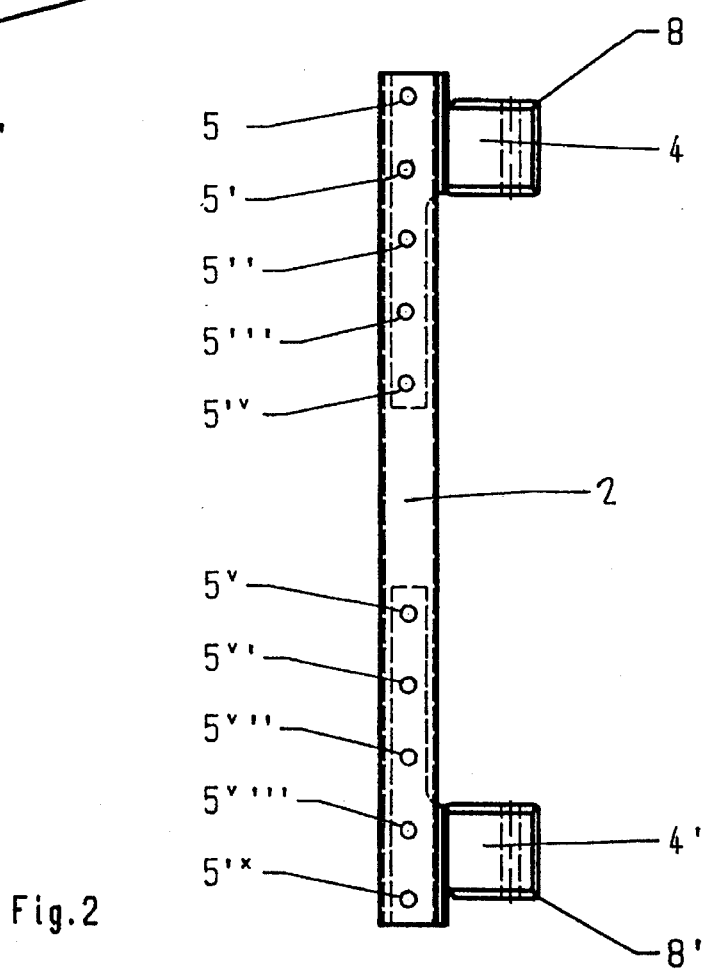
FIG. 2 is a typical view of a side support of the FIG. 1 frame having the joint elements mounted within the ends thereof according to the invention.

In FIG. 2, one of the tubular side supports 2 is shown with a pair of angled joint elements 4 and 4' mounted within opposing ends of the side support. The side support and the two joint elements are made of steel.

Figure 3:
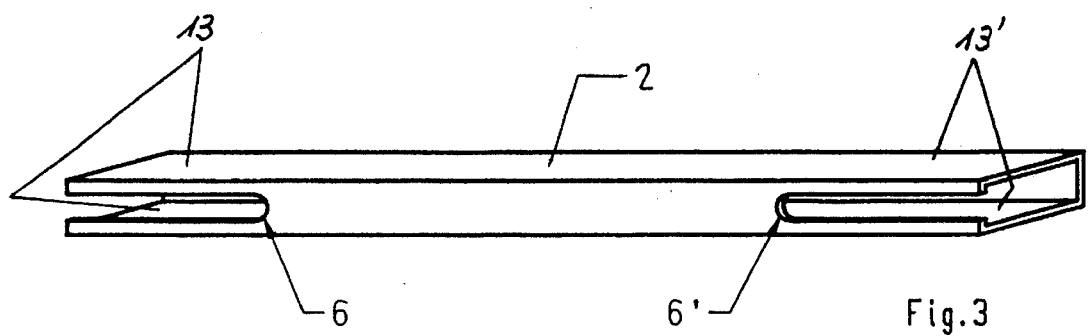
FIG. 3 is a perspective view of a tubular side support of the invention without the attached joint elements.

In FIG. 3 the tubular side support is shown as having a pair of longitudinal slots 6 and 6' opening outwardly at opposing ends of the side support to accommodate the mounting of the joint elements as shown in FIG. 2. The joint elements extend within and along wall sections 13 and 13', legs 9 (FIG. 4) of the joint elements extending beyond the inner edges of the slots, as best seen in FIG. 2. The mounting of the joint elements in such manner compensates for the decrease in sturdiness of the side supports which resulted from the slotting of the opposing ends thereof.

Figure 4:
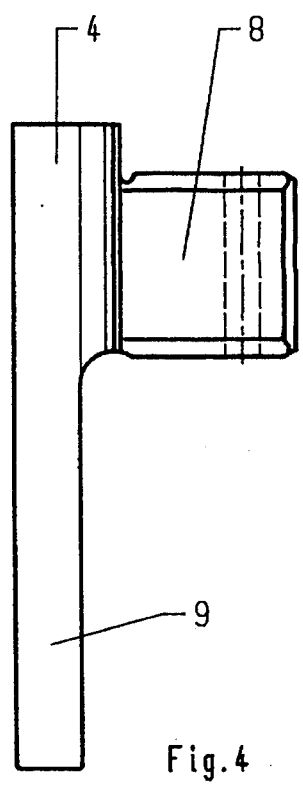
FIG. 4 is a front elevational view of one embodiment of a joint element according to the invention.

A typical angled joint element is shown in FIG. 4 as including an elongated leg or mounting section 9 which extends into the hollow end of the side support at opposite ends, and includes a protrusion 8 which extends through the slots of the side supports.

As shown in FIG. 2, a plurality of fastening means such as spot welds 5 through $5^{IV}$, and $5^V$ through $5^{IX}$ are shown for fastening the elongated legs of the joint elements to the side support at opposite ends, along substantially the entire length of the legs. Rivets or screw connections can otherwise be used, or mounting section 9 of each joint element can be secured in the tubular side support with a suitable adhesive.

The leg or mounting section 9 of each joint element can be tubular or solid depending on the degree of sturdiness required for the side supports.

The tubular side supports as shown in FIG. 3 can be rectangular in cross-section as shown, or of square cross-section. And, mounting section 9 can be longer or shorter than shown, depending on the sturdiness requirements for the side supports. Although steel is used as the primary construction material for the parts of the heddle frame, other materials can be used such as, for example, aluminum, titanium, charcoal fiber reinforced materials, etc.

Figure 5:
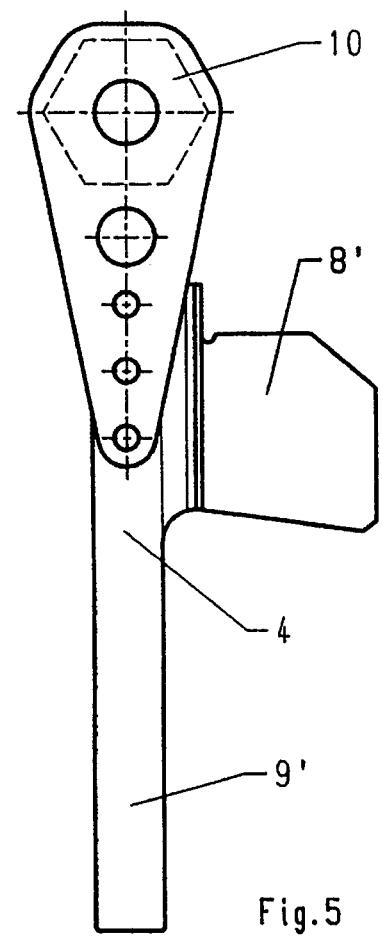
FIG. 5 is a view similar to FIG. 4 of another embodiment of a joint element according to the invention.

The heddle frame structure according to the invention lends itself to the provision of a heddle driving element 10 mounted to the joint element, as shown in FIG. 5. Such driving element extends outwardly beyond the open terminal ends of the side supports. And, as shown in FIG. 5, protrusion 8' for insertion in the horizontal hollow shaft ends may be of slightly different configuration compared to that of protrusion 8, without departing from the invention.

Obviously, many other modifications and variations of the present invention are made possible in the light of the above teaching. It is therefore to be understood that within the scope of the appended claims the invention may be practiced otherwise than as specifically described.

What is claimed is:

1. A heddle frame comprising a pair of spaced, horizontal hollow shafts and a pair of spaced hollow side supports, an angled joint element connecting each opposing end of each of said supports to said shafts, an inner face of each said side support having open longitudinal slots at said opposing ends, each said joint element having an elongated leg extending into each said hollow side support from said opposing ends thereof and beyond an inner edge of each said slot for strengthening said side supports, and each said joint element having a protrusion extending through each said slot and into opposing ends of said horizontal shafts, and means for securely connecting said legs of said joint elements to said side supports along the length of said legs.

2. The heddle frame according to claim 1, wherein said connecting means comprises a plurality of spaced spot welds.

3. The heddle frame according to claim 1, wherein said connecting means comprise a plurality of spaced screw connections.

4. The heddle frame according to claim 1, wherein said connecting means comprise a plurality of spaced rivet connections.

5. The heddle frame according to claim 1, wherein said hollow shafts, said side supports and said joint elements are each of steel material.

6. The heddle frame according to claim 1, wherein each said joint element has a heddle drive element extending from each said leg beyond said opposing ends of said side supports.

* * * * *